United States Patent [19]

Harris

[11] 4,249,758
[45] Feb. 10, 1981

[54] DUCTWORK CONNECTING

[75] Inventor: Robert H. Harris, Jonesboro, Ak.

[73] Assignee: Robert H. Harris Company, Inc., Jonesboro, Ak.

[21] Appl. No.: 936,848

[22] Filed: Aug. 25, 1978

[51] Int. Cl.³ .............................................. F16L 3/04
[52] U.S. Cl. ........................................ 285/158; 285/4; 285/174; 285/423; 29/157 R; 29/428
[58] Field of Search ............... 285/158, 189, 379, 368, 285/235, 236, 237, DIG. 11, DIG. 16, 424, 423, 174, 147 A; 138/DIG. 4; 277/166, 229, 237; 29/157 R, 428, 157.5, 157.6, 157 T

[56] References Cited

U.S. PATENT DOCUMENTS

| | | | |
|---|---|---|---|
| 335,592 | 2/1886 | Keyworth | 285/368 |
| 872,331 | 12/1907 | Dreier | 285/158 |
| 1,130,674 | 3/1915 | Kelly . | |
| 2,131,553 | 9/1938 | DeLin | 285/424 X |
| 2,518,218 | 8/1950 | Benoit . | |
| 2,522,757 | 9/1950 | Larson . | |
| 2,862,040 | 11/1958 | Curran . | |
| 3,226,137 | 12/1965 | Trnka | 285/379 X |
| 3,865,411 | 2/1975 | Rowe et al. | 285/DIG. 16 |
| 3,866,950 | 2/1975 | Skouch et al. | 285/423 |
| 3,892,049 | 7/1975 | Adams | 285/424 X |
| 3,954,289 | 5/1976 | Martin | 285/158 |
| 4,030,494 | 6/1977 | Tenczar | 285/423 X |
| 4,047,572 | 9/1977 | Stary et al. | 285/189 X |
| 4,058,261 | 11/1977 | Pollart | 285/DIG. 22 |
| 4,147,382 | 4/1979 | Wachter | 285/424 X |

FOREIGN PATENT DOCUMENTS 814327 6/1959 United Kingdom ..................... 285/189

Primary Examiner—Dave W. Arola

[57] ABSTRACT

A method and apparatus for readily connecting a main component of a forced air heating and/or cooling system to a branch component so that the connection is airtight. An elongated tubular member has an enlarged circumferential face generally perpendicular to the direction of elongation of the tubular member formed at one end of the member, with a gasket attached to that face, glue on the exterior of the gasket, and a piece of release paper over the glue. The passageway through the tubular member is matched up with an opening in the heating system main component so that the gasket surrounds the opening in the main component, and the gasket is then pushed into the sealing relationship with the main component, the glue on the gasket face joining the tubular member and main component together. Then fasteners are passed through openings formed in the tubular member and gaskets so that the fastening members operatively engage both the tubular member and the main component and securely hold them together. The branch component is then placed around a second end of the tubular member and sealed into contact with it. When the tubular member is of plastic, fiberglass, or the like, it is desirable to provide a metal collar between the fastening screws and the enlarged portion of the tubular member before passing the screws into operative association with the main component.

8 Claims, 4 Drawing Figures

U.S. Patent  Feb. 10, 1981  4,249,758
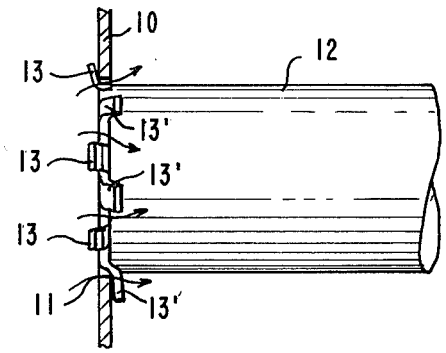
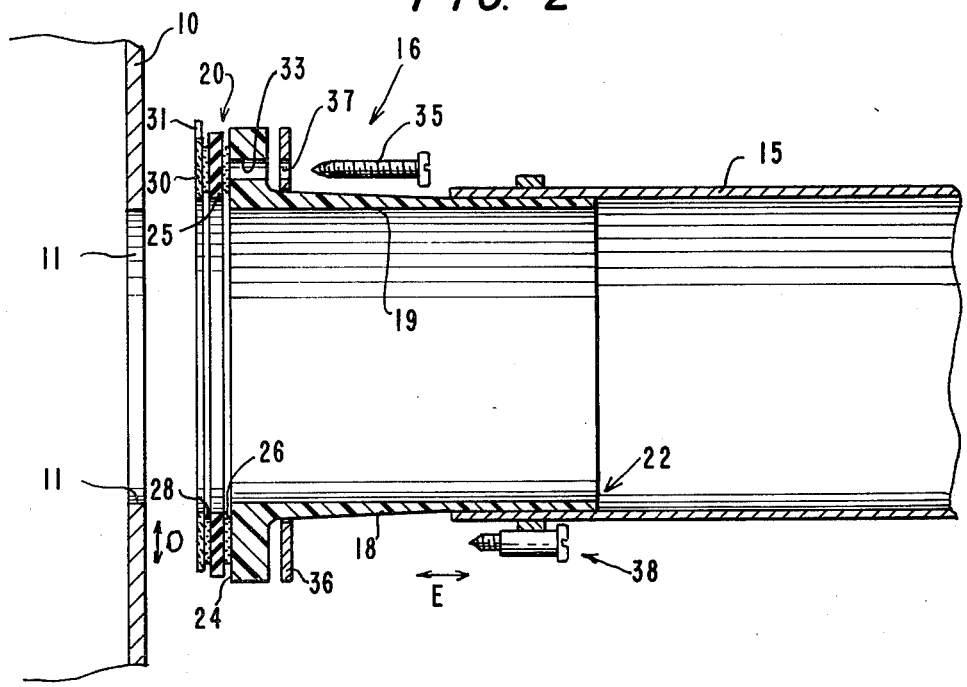
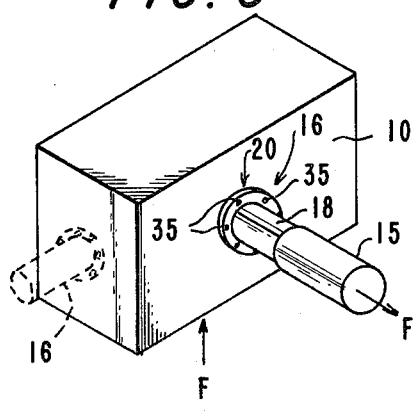
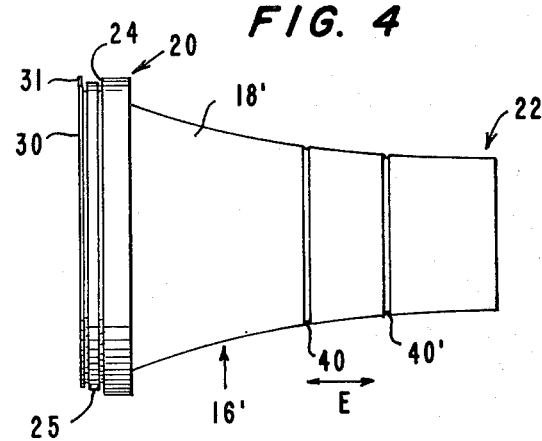

DUCTWORK CONNECTING

BACKGROUND AND SUMMARY OF THE INVENTION

In the heating and cooling industry, the transfer of forced air from the heating or cooling unit to remote areas of the structure being heated or cooled is normally inefficient. The primary reason for such inefficiency is leakage at the connections between main system components and branch system components, such as between the plenum and ducts. This has been a long-standing problem in the industry since installation procedures that require a great deal of skill and effort are not cost effective and/or are not accepted by the labor in the industry. The connecting mechanisms that are traditionally employed are adapted for quick installation, but are inherently inefficient. To date, no system acceptable in the industry has been provided which accomplishes the dual objectives of efficient air transfer between connected components (no air leakage) and ease of use.

According to the present invention, a method and structure have been provided that effect the leak-tight connection between main and branch components in a forced air heating and/or cooling system in a simple manner—one which requires a minimum of expertise and care to be effectively employed—thus satisfying a long-felt need in the industry. According to the method of the present invention, a main and a branch component in a forced air heating and/or cooling system are connected together utilizing a connecting component comprising an elongated tubular member having a passageway, and having a first end with an enlarged circumferential face generally perpendicular to the direction of elongation of the member, and a second end adapted to receive a branch component therearound. The first end face has an annular gasket of flexible material operatively affixed thereto, the gasket having an exterior face with glue thereon, and an annular section of release paper covering the glue. A plurality of openings are formed in the first end extending therethrough and through the gasket generally parallel to the direction of elongation of the tubular member. The method steps comprise providing an opening in the main component having substantially the same cross-sectional area and shape as the section of passageway in the elongated tubular member surrounded by the tubular member enlarged circumferential face; removing the release paper from the tubular member gasket; moving the tubular member into operative contact with the main component so that the gasket surrounds the opening in the main component and the glue on the gasket face joins the tubular member and main component together; passing fastening members (sheet metal screws) through the openings formed in the tubular member first end so that the fastening members operatively engage both the tubular member and the main component and securely hold them together; and bringing the branch component into operative airtight relationship with the tubular member second end, so that an airtight passageway from the main component to the branch component is provided. Where the tubular member is plastic, fiberglass, or the like, a metal collar having openings formed therein corresponding to the openings in the tubular member first end is placed in engagement with a face of the tubular member opposite the face on which the gasket is disposed. Then, the fastening members are passed through the openings in the collar and the tubular member first end to securely hold the collar, tubular member, and main component together.

According to another aspect of the present invention, a connecting component is provided for joining together a main and a branch component in a forced air heating and/or cooling system. The connecting component comprises an elongated tubular member having a passageway, and having a first end with an enlarged circumferential face generally perpendicular to the direction of elongation of the tubular member, and a second end adapted to receive a branch component therearound. An annular gasket of flexible material is operatively affixed to the enlarged face of the tubular member, and has an exterior face thereof with glue thereon. An annular section of release paper covers the glue on the gasket. Means defining a plurality of openings extending through the tubular member first end and through the gasket are provided, the openings extending generally parallel to the direction of elongation of the tubular member and adapted to have fastening members passed therethrough. The cross-sectional area of the passageway in the tubular member can have any shape, and the cross-sectional area can decrease from the first end towards the second end, as well as being different in shape from the first end to the second end. That is, a transition from a round opening in a plenum to a square duct can be provided, or vice versa, etc.

It is the primary object of the present invention to provide a method and structure that readily provide for the leak-tight connection between main and feeder components in a forced air heating and/or cooling system. This and other objects of the invention will become clear from an inspection of the detailed description of the invention, and from the appended claims.

BRIEF DESCRIPTION OF THE DRAWINGS

FIG. 1 is a side view partly in cross-section and partly in elevation of an exemplary prior art connection between main and feeder components in a forced air system;

FIG. 2 is a side, exploded, cross-sectional view of an exemplary connecting assembly for practicing the method according to the invention;

FIG. 3 is a diagrammatic perspective view showing an exemplary connecting component according to the invention connecting a plenum to a duct; and FIG. 4 is a side elevational view of another exemplary connecting component according to the invention.

DETAILED DESCRIPTION OF THE INVENTION

A typical prior art connection between a plenum 10 and a duct (or separate connecting piece) 12 is illustrated schematically in FIG. 1. The component 12 has a plurality of flanges 13, 13' formed on the connecting end thereof, alternate flanges 13, 13' being disposed against the interior and exterior surfaces of the plenum 10 while the component 12 is in registry with the opening 11 in plenum 10. Sheet metal screws may then be employed to further affix the component 12 to the element 10, and tape may be wrapped around the component 12 in registry with both the components 10 and 12. Even when a good deal of care is taken in making such a connection, a large amount of air is free to pass from the plenum 10 to the surrounding environment because of the spaces between the flanges 13, 13', and because it is extremely difficult, if not impossible, to properly wrap tape around two perpendicularly arranged components (10, 12) in an airtight fashion. Normally, a great deal of care is not taken in making the connection, which means that a large amount of air will leak at the connection, as indicated by the arrows in FIG. 1.

In practicing the present invention, the exemplary structure in FIG. 2 will be utilized for connecting a main component 10 (plenum or feeder duct) to a branch component 15 (main duct or branch duct), a connecting component 16 being utilized. The connecting component 16 comprises a tubular member 18 having a passageway 19 defined therein. The tubular member 18 is elongated in dimension E, and has a first end 20 with an enlarged circumferential face 24 generally perpendicular to the direction E (that is generally extending in dimension D). The member 18 also has a second end 22 adapted to receive the branch component 15 therearound, as illustrated in FIG. 2. The member 18 is formed of a suitable material such as metal, plastic, fiberglass, or the like, and may be formed in any size or shape. The passageway 19 at first end 20 will have a cross-sectional area and shape generally corresponding to the cross-sectional area and shape of the opening 11 in component 10, with which it will be employed in operative registry. The cross-sectional dimension, and shape, of the passageway 19 may change from first end 20 towards second end 22 depending upon the shape and cross-sectional area of the branch component 15 with which it will be utilized. The tubular member 16' of FIG. 4, for instance, has a decreasing cross-sectional area from first end 20 to second end 22.

An annular gasket 25 of flexible material (such as rubber or foam) is operatively affixed to the enlarged face 24 of tubular member 18—such as by providing permanent glue 26 between the face 24 and gasket 25—and has an exterior face thereof with glue 28 thereon. The annular gasket 25 will have a shape generally corresponding to the circumferential shape of the face 24, and the shape of the opening 11. An annular section of release paper 30 (having a grasping tab 31) covers the glue 28 on the gasket 25, the glue 28 being chosen so that it is strong enough to temporarily support the component 18 in engagement with the component 10, can effect such supporting relationship very quickly, and is compatable with release papers of suitable construction.

The first end 20 of the tubular member 18 also has means defining a plurality of openings 33 therein, generally parallel to the dimension of elongation E of the tubular member 18. Openings similar to openings 33, and in registry therewith, are formed in the gasket 25, the openings adapted to receive fastening components, such as sheet metal screws 35, therein.

When the tubular member 18 is formed of plastic, fiberglass, or like material that might tend to be damaged by the fastening components 35, preferably a collar 36 is utilized to provide an interface between the heads of the sheet metal screws 35 and the first end 20 of member 18. Such a collar 36 will be formed of metal, and will have a plurality of openings 37 therein, in registry with the openings 33 formed in first end 20 of tubular member 18, and adapted to receive the sheet metal screws 35 therein.

The branch component 15 is connected up to the second end 22 of member 18 in any suitable, ready manner. Preferably as illustrated in FIG. 2, the branch component 15 surrounds the second end 22 of the member 18, and a conventional band with adjusting screw clamp 38 is provided to hold the overlapping portion of branch component 15 in tight contact with second end 22.

A modified connecting component 16' according to the present invention is illustrated in FIG. 4. The component 16' includes a tubular member 18' that has one or more circumferential grooves 40, 40' formed at specified points along the dimension of elongation E thereof. The grooves 40, 40', or other areas of weakness, allow ready severing of the first end 20 from the original second end 22 of the member 18', and the cross-sectional area of the passageway 19 in the FIG. 4 embodiment decreases from first end 20 to original second end 22. In this way, a single member 18' can be utilized to connect branch components 15 of a wide variety of cross-sectional areas to a main component 10, without unnecessary restriction of the air flow, the member 18' being left whole for relatively small branch components 15, being severed at groove 40' for intermediate sized components 15, and being severed at groove 40 for relatively large branch components 15, etc.

The practice of the method according to the present invention will be described with particular reference to FIGS. 2 and 3. The opening 11 is provided in the main component 10, the opening 11 having substantially the same cross-sectional area and shape as the section of passageway 19 in the elongated tubular member 18 surrounded by the tubular member enlarged circumferential face 24. The release paper 30 is then removed from gasket 25, and the tubular member 18 is moved in dimension E toward main component 10 and into operative contact therewith so that the glue 28 on the exterior face of gasket 25 joins the tubular member 18 and the main component 10 together, the opening 11 being in complete registry with the passageway 19 in view of the fact that the gasket 25 surrounds the opening 11. Then, fastening members, such as sheet metal screws 35, are passed through the openings 33 formed in the tubular member first end 20 into operative engagement with both the tubular member 18 and the main component 10, to securely hold them together. Then, the branch component 15 is brought into operative airtight relationship with the tubular member 18, so that an airtight passageway 19 is provided from the main component 10 to the branch component 15. Such a completed connection is illustrated schematically in FIG. 3, the component 10 being shown as a plenum and the component 15 as a duct. Air flowing in direction F flows upwardly into the plenum 10 and then outwardly through the duct 15 without any leakage at the connection therebetween. Of course, any number of connecting components 16 may be utilized with the main component 10, depending upon how many branch components 15 will be taken off therefrom (see dotted line connecting component 16 in FIG. 3).

When the tubular member 18 is plastic, or of like material that may be damaged by the sheet metal screws 35, the collar 36 is placed in engagement with the first end 20 of member 18 so that the openings 33, 37 are in registry, and then the fastening components 35 pass through the openings 37, 33, and into engagement with the main component 10 to securely hold the collar 36, tubular member 18, and main component 10 together.

It will thus be seen that according to the present invention a simple procedure and structure have been provided that allows ready, leak-tight connection between main and branch components in a heating and/or cooling forced air system. The practice of the procedure and the utilization of the structure are so simple that they can readily be employed by unskilled labor, and employed in such a manner that proper connection is just as easy as improper connection, and no more time consuming. Yet the leak-tight aspects thereof are virtually foolproof.

While the invention has been herein shown and described in what is presently conceived to be the most practical and preferred embodiment thereof, it will be apparent to those of ordinary skill in the art that many modifications may be made thereof within the scope of the invention. For instance, where the main component 10 does not have planar faces in which the opening 11 is defined, the face 24 of tubular member 18 will be shaped to generally correspond to the faces of component 10 defining opening 11. Many other modifications are of course also possible, thus the invention is to be accorded the broadest scope of the appended claims so as to encompass all equivalent methods and structures.

What is claimed is:

1. A method of connecting up a sheet metal main component and a branch component in a forced air heating and/or cooling system, utilizing a connecting component comprising an elongated tubular member having a passageway, and having a first end with an enlarged circumferential face generally perpendicular to the direction of elongation of the member, and a second end adapted to receive a branch component therearound, the first end face having an annular gasket of flexible material operatively affixed thereto, the gasket having an exterior face with glue thereon, and an annular section of release paper covering the glue, and the first end having plurality of openings extending therethrough, and through the gasket, generally parallel to the direction of elongation of the tubular member, said method comprising the steps of
   (a) providing a generally circular opening in the sheet metal main component having substantially the same cross-sectional area and shape as the section of passageway in the elongated tubular member surrounded by the tubular member enlarged circumferential face;
   (b) removing the release paper from the tubular member gasket;
   (c) moving the tubular member into operative contact with the main component so that the gasket surrounds the opening in the main component and tubular member and main component together;
   (d) passing sheet metal fasteners through the openings formed in the tubular member first end so that the fasteners operatively engage both the tubular member and the main component and securely hold them together; and
   (e) bringing the branch component into operative airtight relationship with the tubular member second end, so that an airtight passageway from the main component to the branch component is provided.

2. A method as recited in claim 1 wherein steps (a)–(e) are practiced sequentially.

3. A method as recited in claim 1 wherein the tubular member is plastic or fiberglass, and comprising the further step of placing a metal collar having openings formed therein corresponding to the openings in the tubular member first end in engagement with a face of the tubular member opposite the face on which the gasket is disposed, and then passing the sheet metal fasteners through the openings in the collar and the tubular member first end to securely hold the collar, tubular member, and main component together.

4. A method as recited in claim 1 wherein the main component is a plenum and the branch component is a duct.

5. A method as recited in claim 1 wherein the main component is a feeder duct and the branch component is a branch duct.

6. A method as recited in claim 1 wherein the tubular member is circular in cross-section.

7. A method as recited in claim 1 wherein the cross-sectional area of the passageway in the tubular member decreases from the first end to the second end thereof.

8. A connecting component for joining together a main and a branch component in a forced air heating and/or cooling system and comprising
   an elongated rigid tubular member having a passageway, and having a first end with an enlarged circumferential face generally perpendicular to the direction of elongation of the tubular member, and a second end adapted to receive a branch component therearound; the tubular member being formed of a material selected from the group consisting essentially of plastic and fiberglass;
   an annular gasket of flexible material operatively affixed to said enlarged face of said tubular member, and having an exterior face thereof with glue thereon;
   an annular section of release paper covering the glue on the gasket;
   means defining a plurality of openings extending through the tubular member first end and through the gasket, generally parallel to the direction of elongation of said tubular member, and adapted to have fastening members pass therethrough; and
   a metal collar having means defining openings therein corresponding to the openings formed in the tubular member first end, and the collar being of such a size as to be disposed in operative engagement with a face of said first end opposite said first end face on which said gasket is disposed, with the opening in the collar in registry with the openings in the tubular member first end.

* * * * *

REEXAMINATION CERTIFICATE (2140th)
United States Patent [19]
Harris

[11] B1 4,249,758

[45] Certificate Issued  Nov. 23, 1993

[54] DUCTWORK CONNECTING

[75] Inventor: Robert H. Harris, Jonesboro, Ark.

[73] Assignee: Robert Harris Company, Inc., Jonesboro, Ark.

Reexamination Request:
No. 90/002,361, Jun. 10, 1991

Reexamination Certificate for:
Patent No.: 4,249,758
Issued: Feb. 10, 1981
Appl. No.: 936,848
Filed: Aug. 25, 1978

Certificate of Correction issued Jul. 27, 1993.

[51] Int. Cl.⁵ ............................................. F16L 3/04
[52] U.S. Cl. ...................................... 285/158; 285/4; 285/174; 285/423; 29/428; 29/890.14
[58] Field of Search .................. 285/158, 4, 174, 423, 285/189, 379, 368, 424; 29/157 R, 428, 890.14

[56]  References Cited
U.S. PATENT DOCUMENTS

| | | |
|---|---|---|
| 335,592 | 2/1886 | Keyworth . |
| 872,331 | 12/1907 | Dreier ................................. 285/158 |
| 1,130,674 | 3/1915 | Kelly . |
| 2,131,553 | 9/1938 | Delin ............................. 285/424 X |
| 2,518,218 | 8/1950 | Benoit . |
| 2,522,757 | 9/1950 | Larson . |
| 2,862,040 | 11/1958 | Curran . |
| 3,226,137 | 12/1965 | Trinka ............................ 285/379 X |
| 3,865,411 | 2/1975 | Rowe et al. ......................... 285/915 |
| 3,866,950 | 2/1975 | Skoch et al. . |
| 3,892,049 | 7/1975 | Adams ............................ 285/424 X |
| 3,909,910 | 10/1975 | Rowe et al. . |
| 3,954,289 | 5/1976 | Martin ................................ 285/158 |
| 4,030,494 | 6/1977 | Tenczar ........................... 285/423 X |
| 4,047,572 | 9/1977 | Stary et al. ....................... 285/189 X |
| 4,058,261 | 11/1977 | Pollart ................................ 285/921 |
| 4,147,382 | 2/1977 | Wachter . |
| 4,163,137 | 10/1977 | Close, Jr. . |

FOREIGN PATENT DOCUMENTS 2642767  8/1977  Fed. Rep. of Germany .
814327   6/1959  United Kingdom .

OTHER PUBLICATIONS

Sheet Metal and Air Conditioning Contractors National Association, Inc. "High Velocity Systems" First Edition—1965.
Sheet Metal and Air Conditioning Contractors National Association, Inc., "Low Pressure Duct Construction Standards", 5th Edition, 1976.

Primary Examiner—Dave W. Arola

[57]  ABSTRACT

A method and apparatus for readily connecting a main component of a forced air heating and/or cooling system to a branch component so that the connection is airtight. An elongated tubular member has an enlarged circumferential face generally perpendicular to the direction of elongation of the tubular member formed at one end of the member, with a gasket attached to that face, glue on the exterior of the gasket, and a piece of release paper over the glue. The passageway through the tubular member is matched up with an opening in the heating system main component so that the gasket surrounds the opening in the main component, and the gasket is then pushed into the sealing relationship and the main component, the glue on the gasket face joining the tubular member and main component together. Then fasteners are passed through openings formed in the tubular member and gaskets so that the fastening members operatively engage both the tubular member and the main component and securely hold them together. The branch component is then placed around a second end of the tubular member and sealed into contact with it. When the tubular member is of plastic, fiberglass, or the like, it is desirable to provide a metal collar between the fastening screws and the enlarged portion of the tubular member before passing the screws into operative association with the main component.

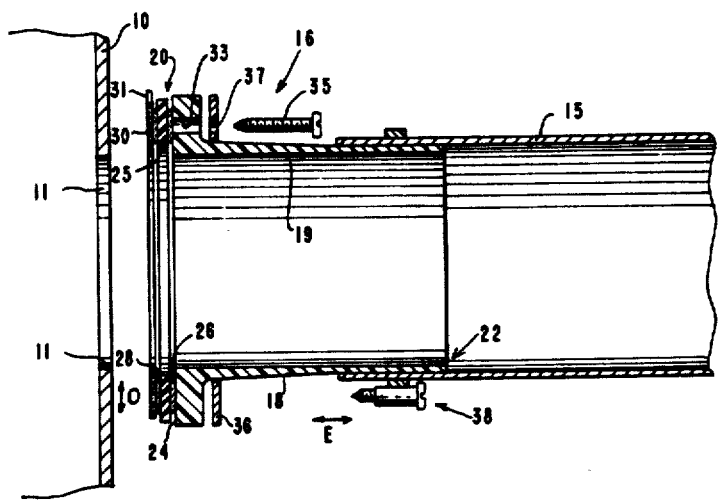

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–8 is confirmed.

New claims 9–14 are added and determined to be patentable.

9. *A connecting component as recited in claim 8 where said enlarged circumferential face is integral with said tubular member.*

10. *A component as recited in claim 8 wherein said enlarged circumferential face is circular in plan.*

11. *A method of connecting up a sheet metal main component and a branch component in a forced air heating and/or cooling system, utilizing a connecting component comprising an elongated tubular member having a passageway, and having a first end with an enlarged circumferential face generally perpendicular to the direction of elongation of the member, and a second end adapted to receive a branch component therearound, the first end face having an annular gasket of flexible material operatively affixed thereto, the gasket having an exterior face with glue thereon, and an annular section of release paper covering the glue, and the first end having a plurality of openings extending therethrough, and through the gasket, generally parallel to the direction of elongation of the tubular member, said method comprising the steps of*

*(a) providing a generally circular opening in the sheet metal main component having substantially the same cross-sectional area and shape as the section of passageway in the elongated tubular member surrounded by the tubular member enlarged circumferential face;*

*(b) removing the release paper from the tubular member gasket; and*

*(c) moving the glue on the exterior face of the gasket of the tubular member into operative contact with the main component so that the gasket surrounds the opening in the main component and the glue and gasket initially hold the tubular member and main component together; then*

*(d) passing sheet metal fasteners through the openings formed in the tubular member first end so that the fasteners operatively engage both the tubular member and the main component and securely hold them together; and*

*(e) bringing the branch component into operative airtight relationship with the tubular member second end, so that an airtight passageway from the main component to the branch component is provided.*

12. *A method as recited in claim 11 wherein the enlarged circumferential face of the tubular member is integral with the tubular member, and where step (c) is practiced by moving the entire tubular member toward the main component so that the glue on the gasket exterior face of the enlarged circumferential face of the tubular member contacts the main component so that the glue initially holds the tubular member in place, and then immediately practicing step (d).*

13. *A method as recited in claim 11, wherein the sheet metal fasteners are sheet metal screws, and wherein step (d) is practiced by passing the sheet metal screws through the openings to hold the main component and tubular member together.*

14. *A method as recited in claim 12 wherein the sheet metal fasteners are sheet metal screws, and wherein step (d) is practiced by passing the sheet metal screws through the openings to hold the main component and tubular member together.*

* * * * *